US012609634B2

(12) United States Patent
Yoshikawa

(10) Patent No.: US 12,609,634 B2
(45) Date of Patent: Apr. 21, 2026

(54) ELECTRIC-POWER CONVERSION APPARATUS

(71) Applicant: Mitsubishi Electric Corporation, Tokyo (JP)

(72) Inventor: Hideki Yoshikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 205 days.

(21) Appl. No.: 18/300,808

(22) Filed: Apr. 14, 2023

(65) Prior Publication Data

US 2023/0378887 A1 Nov. 23, 2023

(30) Foreign Application Priority Data

May 19, 2022 (JP) ................................. 2022-082026

(51) Int. Cl.
    *H02M 7/49* (2007.01)
    *H02M 1/00* (2007.01)
    *H02M 7/5387* (2007.01)
(52) U.S. Cl.
    CPC ........... *H02M 7/49* (2013.01); *H02M 1/0009* (2021.05); *H02M 7/5387* (2013.01)
(58) Field of Classification Search
    CPC ..... H02M 7/49; H02M 1/0009; H02M 7/5387
    See application file for complete search history.

(56) References Cited

U.S. PATENT DOCUMENTS

| | | | |
|---|---|---|---|
| 6,456,508 B1 | 9/2002 | Namai et al. | |
| 6,735,537 B2 * | 5/2004 | Liu | H02M 7/53873 318/599 |
| 7,414,425 B2 * | 8/2008 | O'Gorman | H02P 23/04 318/696 |
| 9,209,677 B2 * | 12/2015 | Nakayama | H02M 1/32 |

(Continued)

FOREIGN PATENT DOCUMENTS

| | | |
|---|---|---|
| JP | 2001-178149 A | 6/2001 |
| JP | 2007-305836 A | 11/2007 |

(Continued)

OTHER PUBLICATIONS

Office Action issued Jul. 1, 2025 in Japanese Application No. 2022-082026.

*Primary Examiner* — Danny Nguyen
*Assistant Examiner* — Samantha L Faubert
(74) *Attorney, Agent, or Firm* — Sughrue Mion, PLLC

(57) ABSTRACT

Provided is an electric-power conversion apparatus including respective arms of three phases each having switching devices that are connected with a DC power source and an external connection point that is connected with a winding of an electric rotating machine. A phase current detection unit detects a current of each of the three phases, and a switching control apparatus that controls the electric rotating machine by turning on or off the positive-polarity switching devices and the negative-polarity switching devices and that determines that an excessive current has occurred, in the case where a current detected by the phase current detection (Continued)

unit exceeds a predetermined threshold value, and then turns on any one of a group of all the positive-polarity switching devices and a group of all the negative-polarity switching devices and turns off the other one thereof.

9 Claims, 13 Drawing Sheets

(56) References Cited

U.S. PATENT DOCUMENTS

| | | | | |
|---|---|---|---|---|
| 9,627,998 | B2 * | 4/2017 | Shinohara | H02P 27/085 |
| 9,673,743 | B1 * | 6/2017 | Billson | H02P 23/26 |
| 11,456,677 | B2 * | 9/2022 | Wang | H02H 7/1257 |
| 11,979,097 | B2 * | 5/2024 | Matsuyama | H02M 7/05 |

FOREIGN PATENT DOCUMENTS

| | | |
|---|---|---|
| JP | 2021-100351 A | 7/2021 |
| WO | 2012/056766 A1 | 5/2012 |

* cited by examiner

FIG.4
| INPUT | | OUTPUT |
|-------|-----|--------|
| OC | D | O |
| H | — | L |
| L | H/L | H/L |
FIG.5
PHASE CURRENTS
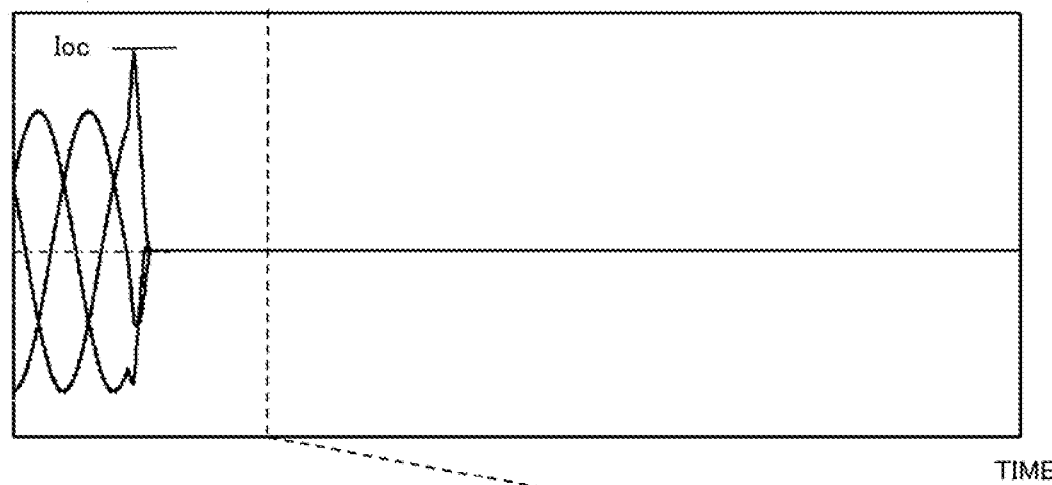
TIME
PHASE CURRENTS
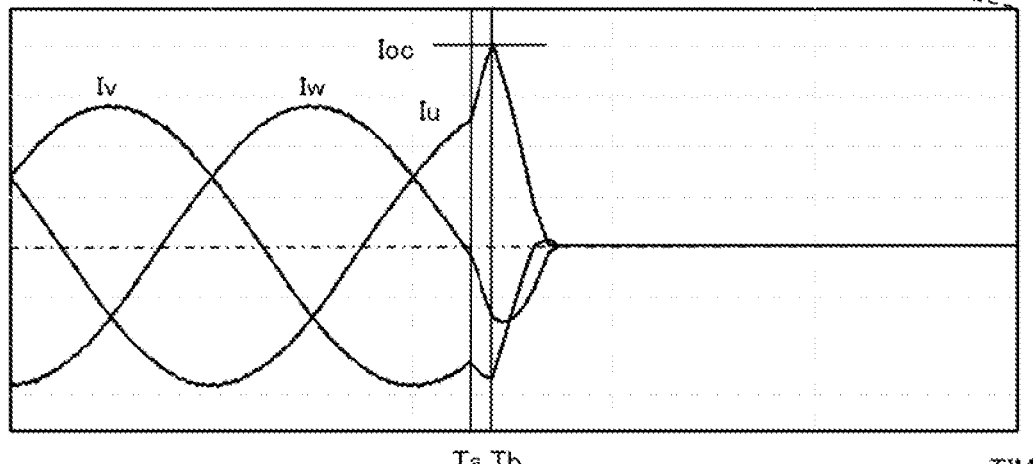
TIME

FIG.9

| INPUT | | | OUTPUT |
|---|---|---|---|
| OCU | OCL | D | O |
| H | — | — | H |
| L | H | — | L |
| L | L | H/L | H/L |

FIG.10

| INPUT | | | OUTPUT |
|---|---|---|---|
| OCU | OCL | D | O |
| H | — | — | L |
| L | H | — | H |
| L | L | H/L | H/L |

PHASE CURRENTS

TIME

PHASE CURRENTS

TIME

ELECTRIC-POWER CONVERSION APPARATUS

TECHNICAL FIELD

The present disclosure relates to an electric-power conversion apparatus.

BACKGROUND

In recent years, automobiles (hereinafter, referred to as electric vehicles), such as a hybrid automobile, a plug-in hybrid automobile, an electric automobile, and a fuel-cell vehicle, that are each equipped with an electric power train have widely spread. Each of these electric vehicles is equipped with an electric rotating machine for driving vehicle wheels and an inverter, which is an electric-power conversion apparatus for driving the electric rotating machine, in addition to the configuration of an automobile whose driving power source is a conventional gasoline engine, or as a substitute therefor.

An inverter converts DC electric power of a DC power source into predetermined AC electric power, by turning on/off two or more semiconductor switching devices at a predetermined switching frequency, so as to adjust the torque and the rotation speed of an electric rotating machine, as a load. In a semiconductor switching device, it is required to make a current flow in the forward direction and in the reverse direction. In the case where as a semiconductor switching device, a FET (Field Effect Transistor) is utilized, it is made possible to utilize a body diode (referred to also as a parasitic diode) incorporated in the FET, without connecting a reflux diode therewith. Accordingly, an FET is frequently utilized in a small-size and high-performance inverter.

However, in some cases, application of a large current deteriorates the body diode of an FET. As is the case with an ordinary diode, a continuously applicable current and a short-time rated current, which is an allowable current larger than the continuously applicable current, are specified also for the body diode of an FET. When the applied current exceeds the short-time rated current of the body diode, the lifetime of the FET may be shortened.

In particular, there has been widely adopted the control in which when an excessive current flows in a switching device of an electric-power conversion apparatus, all the switching device thereof are turned off so as to suppress the excessive current. However, in such cases, the excessive current flows in a body diode. In this case, it is required to protect the body diode so as to prevent the switching device from being deteriorated.

As measures for the current that flows into the body diode, there has been proposed a technology in which another diode is connected with the semiconductor switching device in an anti-parallel manner. There has been disclosed a method (e.g., Patent Document 1) in which an additional reflux diode, the current-conduction on-voltage of which is set to be lower than the conduction-start voltage of the body diode, is provided.

CITATION LIST

Patent Literature

[Patent Document 1] Japanese Patent Application Laid-Open No. 2007-305836

However, in the technology disclosed in Patent Document 1, it is required to provide a reflux diode in addition to the semiconductor switching device. Providing the additional reflux diode is contrary to the downsizing and cost-saving required for an electric-power conversion apparatus. In order to increase the allowable current of the body diode of a FET so as to raise the tolerance without providing any additional reflux diode, it is required to expand the semiconductor size of the FET; this case is also contrary to the downsizing and cost-saving of an electric-power conversion apparatus.

SUMMARY

The present disclosure has been implemented for solving the foregoing problem in an electric-power conversion apparatus. The objective of the present disclosure is to obtain an electric-power conversion apparatus that can suppress an excessive current that flows in a switching device thereof so as to protect the body diode of the switching device and to prevent the switching device from being deteriorated.

Solution to Problem

An electric-power conversion apparatus disclosed in the present disclosure includes respective arms of three phases in each of which there are provided a positive-polarity switching device connected with a positive-polarity side of a DC power source, a negative-polarity switching device connected with a negative-polarity side of the DC power source, and an external connection point at which the positive-polarity switching device and the negative-polarity switching device are connected in series with each other and that is connected with a winding of an electric rotating machine, a phase current detection unit that detects a current of each of the three phases flowing between the corresponding external connection point and the corresponding winding, and a switching control apparatus that controls the electric rotating machine by turning on or off the positive-polarity switching devices and the negative-polarity switching devices and that determines that an excessive current has occurred, in the case where a current detected by the phase current detection unit exceeds a predetermined threshold value, and then turns on any one of a group of all the positive-polarity switching devices and a group of all the negative-polarity switching devices and turns off the other one thereof.

Advantageous Effects

In an electric-power conversion apparatus according to the present disclosure, in the case where an excessive current flows in the switching device of the electric-power conversion apparatus, any one of the group of all the positive-polarity switching devices and the group of all the negative-polarity switching devices are turned on and the other one thereof are turned off, so that it is made possible to suppress a large current from flowing in the body diode of the switching device, while suppressing an excessive current. As a result, it is made possible to obtain an electric-power conversion apparatus that does not require any additionally provided reflux diode and expansion of the semiconductor size and that can protect the body diode so as to prevent the switching device from being deteriorated, while promoting downsizing and cost saving.

The foregoing and other object, features, aspects, and advantages of the present invention will become more apparent from the following detailed description of the present invention when taken in conjunction with the accompanying drawings.

BRIEF DESCRIPTION OF DRAWINGS

FIG. 4 is a table representing an operational logic of a signal cutoff circuit in the electric-power conversion apparatus according to Comparative Example;

FIG. 5 is a set of time charts representing the excessive-current-handling control in the electric-power conversion apparatus according to Comparative Example;

FIG. 9 is a table representing an operational logic of a positive-polarity three-phase short-circuit processing circuit in the electric-power conversion circuit according to Embodiment 1;

FIG. 10 is a table representing an operational logic of a negative-polarity three-phase short-circuit processing circuit in the electric-power conversion circuit according to Embodiment 1;

FIG. 11 is a first diagram representing the relationship between a current direction and excessive-current detection in the electric-power conversion apparatus according to Embodiment 1;

FIG. 12 is a second diagram representing the relationship between a current direction and excessive-current detection in the electric-power conversion apparatus according to Embodiment 1;

FIG. 14 is a diagram representing current flows during the excessive-current-handling control in the electric-power conversion apparatus according to Embodiment 1; and FIG. 15 is a configuration diagram of an electric-power conversion apparatus according to Embodiment 2.

DESCRIPTION OF EMBODIMENTS

Hereinafter, Embodiments of an electric-power conversion apparatus according to the present disclosure will be explained with reference to the drawings.

1. Embodiment 1

<Configuration of Electric-Power Conversion Apparatus>

Figure 1:
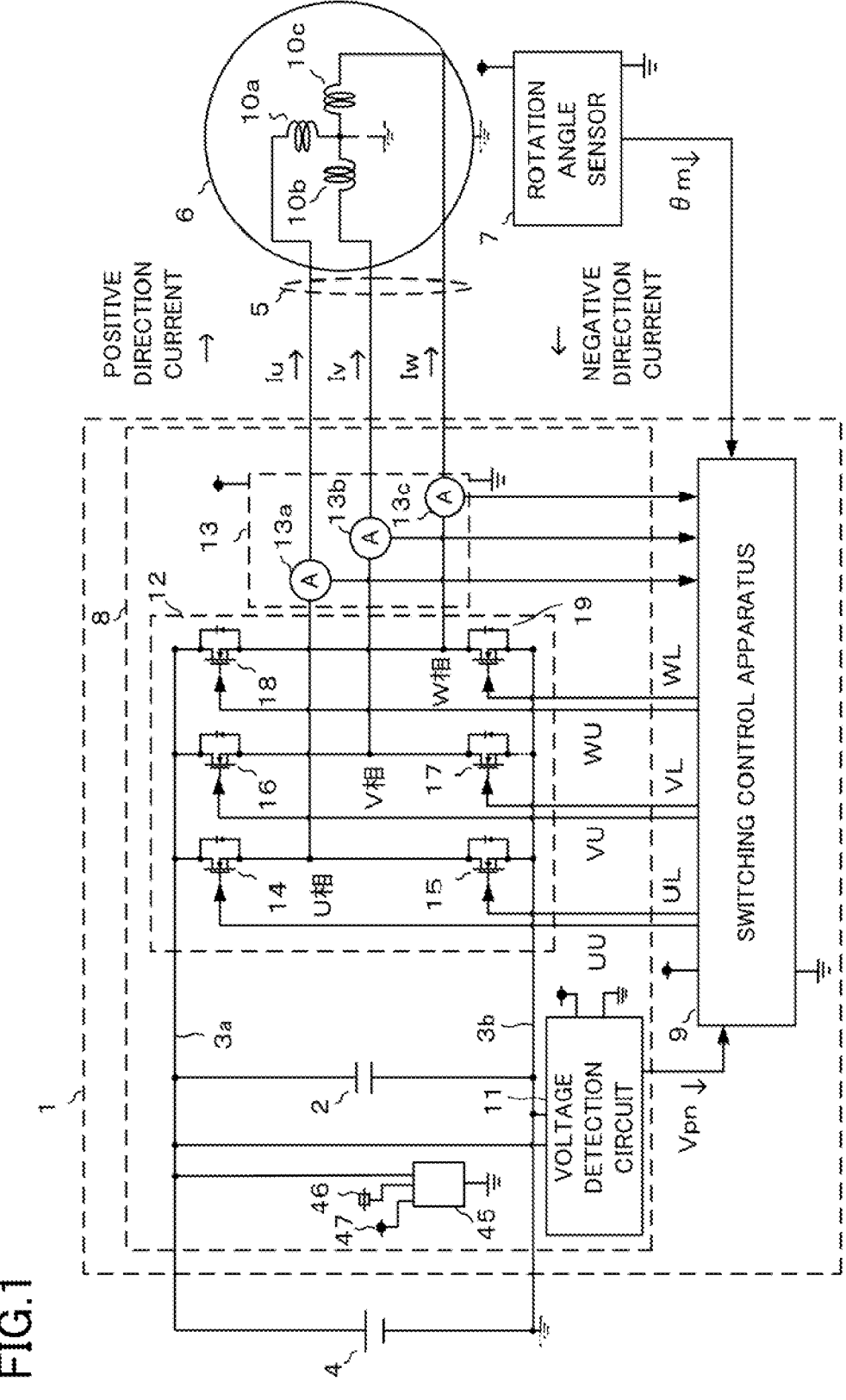
FIG. 1 is a configuration diagram of an electric-power conversion apparatus according to Embodiment 1.

FIG. 1 is a configuration diagram of an electric-power conversion apparatus 1 according to Embodiment 1. The electric-power conversion apparatus 1 is connected with a DC power source 4 through DC bus-bars 3a and 3b. The electric-power conversion apparatus 1 receives driving electric power from the DC power source 4 or transmits regenerative electric power to the DC power source 4. The electric-power conversion apparatus 1 is connected with an electric rotating machine 6 through AC bus-bars 5. The electric-power conversion apparatus 1 transmits driving electric power to the electric rotating machine 6 or receives regenerative electric power from the electric rotating machine 6.

The electric rotating machine 6 has a U-phase winding 10a, a V-phase winding 10b, and a W-phase winding 10c. In addition, the electric rotating machine 6 has a rotation angle sensor 7 for detecting the rotation angle of the electric rotating machine 6. The electric rotating machine 6 rotation-drives a load and can regenerate rotation energy of the load into electric energy. As the electric rotating machine 6, a motor whose rotor has a permanent magnet, a motor whose rotor has an electromagnet, a brush-type motor, a brushless motor, or the like can be utilized.

The electric-power conversion apparatus 1 has an inverter circuit 8 and a switching control apparatus 9. The inverter circuit 8 has a capacitor 2 connected between the DC bus-bars 3a and 3b at the power-source input side, a voltage detection circuit 11 for detecting the DC bus-bar voltage of the inverter circuit 8, an electric-power conversion circuit 12 that includes two or more switching devices and performs conversion between DC electric power and AC electric power, and a current sensor 13 for detecting currents that flow between the electric rotating machine 6 and the inverter circuit 8 itself through the AC bus-bars 5.

As the switching device of the electric-power conversion circuit 12, for example, a MOSFET (Metal Oxide Semiconductor Field Effect Transistor) represented in FIG. 1 or the like is utilized. In a MOSFET, a diode having an anti-parallel structure is formed; the diode is referred to as a body diode (referred to also as a parasitic diode).

The electric-power conversion circuit 12 is a generally well known inverter in which six switching devices are connected in a full-bridge manner. U-phase switching devices 14 and 15 in a pair are connected in series with each other; V-phase switching devices 16 and 17 in a pair are connected in series with each other; W-phase switching devices 18 and 19 in a pair are connected in series with each other. Each of these pairs is referred to as an arm.

Each of the U-phase arm, the V-phase arm, and the W-phase arm is connected in parallel with the DC power source 4. An external connection point, which is the middle point between the switching devices 14 and 15 that form the U-phase arm, is connected with a U-phase input terminal of the electric rotating machine 6. An external connection point, which is the middle point between the switching devices 16 and 17 that form the V-phase arm, is connected with a V-phase input terminal of the electric rotating machine 6. An external connection point, which is the middle point between the switching devices 18 and 19 that form the W-phase arm, is connected with a W-phase input terminal of the electric rotating machine 6.

Each of the switching devices 14, 16, and 18 that are each connected with the positive-polarity DC bus-bar 3a of the DC power source 4 is referred to as an upper arm. Each of the switching devices 15, 17, and 19 that are each connected with the negative-polarity DC bus-bar 3b of the DC power source 4 is referred to as a lower arm.

The capacitor 2 in the inverter circuit 8 suppresses a ripple in the DC bus-bar voltage. Moreover, the capacitor 2 lowers the power-source impedance for the inverter circuit 8 so as to raise the AC current driving capability of the inverter circuit 8. Furthermore, the capacitor 2 absorbs a surge voltage. By use of division resistors or the like, the voltage detection circuit 11 divides the DC bus-bar voltage into voltages that can be read by the switching control apparatus 9. The switching control apparatus 9 receives DC bus-bar voltage information from the voltage detection circuit 11.

The current sensor 13 detects phase currents of the electric rotating machine 6 that flow in the AC bus-bars 5. The current sensor 13 converts a current value into a voltage and then outputs the voltage to the switching control apparatus 9. In FIG. 1 represents a configuration in which the U-phase current sensor 13a detects a U-phase current, the V-phase current sensor 13b detects a V-phase current, and the W-phase current sensor 13c detects a W-phase current. In addition, as the current sensor 13, shunt resistors may be utilized.

In the present embodiment, a current that flows in the direction from the electric-power conversion apparatus 1 to the electric rotating machine 6 is defined as a positive-direction current, and a current that flows in the reverse direction is defined as a negative-direction current. A current that flows between the external connection point between the switching devices 14 and 15 and the U-phase input terminal of the electric rotating machine 6 is defined as a phase current Iu. A current that flows between the external connection point between the switching devices 16 and 17 and the V-phase input terminal of the electric rotating machine 6 is defined as a phase current Iv. A current that flows between the external connection point between the switching devices 18 and 19 and the W-phase input terminal of the electric rotating machine 6 is defined as a phase current Iw.

The rotation angle sensor 7 is a sensor for detecting a rotor rotation angle of the electric rotating machine 6. As the rotation angle sensor 7, a resolver-type encoder, an optical encoder, or the like can be utilized. The detected rotor rotation angle is outputted to the switching control apparatus 9. In addition, a rotor rotation angle $\theta m$ is converted into an electric angle $\theta e$, based on the number of pole pairs of permanent magnets in the electric rotating machine 6.

<Hardware Configuration of Switching Control Apparatus>

Figure 2:
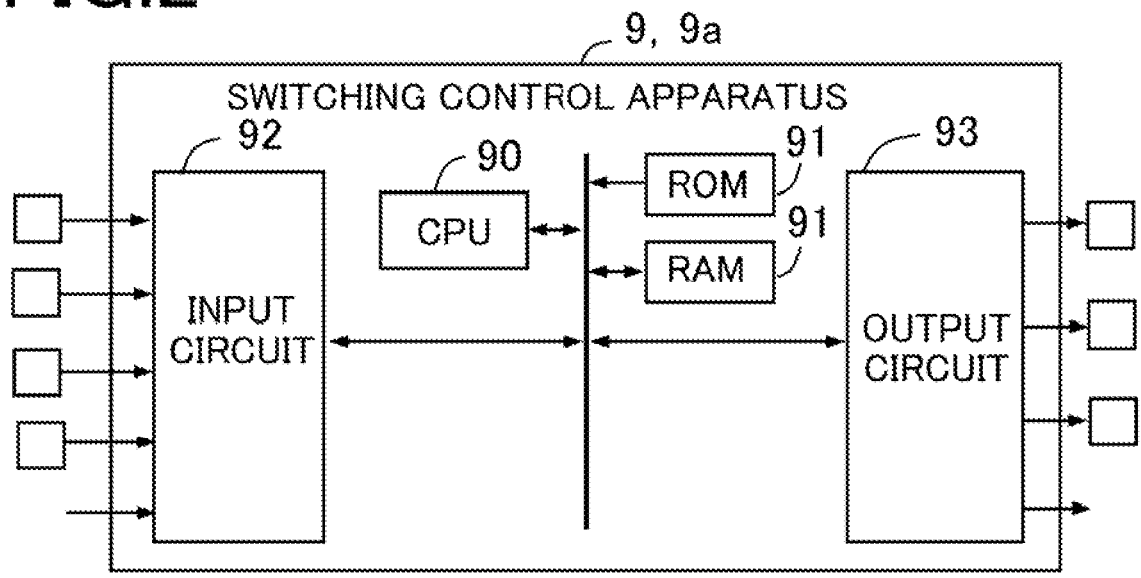
FIG. 2 is a hardware configuration diagram of a switching control apparatus in the electric-power conversion apparatus according to Embodiment 1.

FIG. 2 is a hardware configuration diagram of the switching control apparatus 9 in the electric-power conversion apparatus 1 according to Embodiment 1. The hardware configuration in FIG. 2 can be applied also to a switching control apparatus 9a. In the present embodiment, as the representative apparatus thereof, the switching control apparatus 9 will be explained. In the present embodiment, the respective functions of the switching control apparatus 9 are realized by processing circuits included in the switching control apparatus 9. Specifically, as illustrated in FIG. 2, the switching control apparatus 9 includes, as the processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

It may be allowed that as the computing processing unit 90, an ASIC (Application Specific Integrated Circuit), an IC (Integrated Circuit), a DSP (Digital Signal Processor), an FPGA (Field Programmable Gate Array), any one of various kinds of logic circuits, any one of various kinds of signal processing circuits, or the like is provided. In addition, it may be allowed that as the computing processing unit 90, two or more computing processing units of the same type or different types are provided and respective processing items are executed in a sharing manner. As the storage apparatuses 91, there are provided a RAM (Random Access Memory) that can read data from and write data in the computing processing unit 90, a ROM (Read Only Memory) that can read data from the computing processing unit 90, a flash memory, and the like. The input circuit 92 is connected with various kinds of sensors and switches and is provided with an A/D converter and the like for inputting output signals from the sensors and the switches to the computing processing unit 90. The output circuit 93 is connected with electric loads and is provided with a driving circuit and the like for converting and outputting a control signal from the computing processing unit 90 to the electric loads.

The computing processing unit 90 runs software items (programs) stored in the storage apparatus 91 such as a ROM and collaborates with other hardware devices in the switching control apparatus 9, such as the storage apparatus 91, the input circuit 92, and the output circuit 93, so that the respective functions provided in the switching control apparatus 9 are realized. Setting data items such as a threshold value and a determination value to be utilized in the switching control apparatus 9 are stored, as part of software items (programs), in the storage apparatus 91 such as a ROM. The respective functions of the constituent elements in the switching control apparatus 9 will be explained. It may be allowed that the respective functions included in the switching control apparatus 9 are configured with either software modules or combinations of software and hardware.

<Functions of Switching Control Apparatus>

The switching control apparatus 9 controls the whole electric-power conversion apparatus 1. The process of calculation, by the switching control apparatus 9, of on/off control signals for the switching devices 14 through 19 will be explained. The switching control apparatus 9 receives a command value Trqc of torque to be generated by the electric rotating machine 6 from an unillustrated higher-hierarchy control apparatus thereof or a control program. In response to the torque command value Trqc, the switching control apparatus 9 determines a d-axis current command value Id1c and a q-axis current command value Iq1c.

The d axis means the direction of the position (magnetic flux) of the magnetic-pole in the electric rotating machine, and the q axis means the direction electrically perpendicular to the d axis; the d axis and the q axis form a d-q axis coordinate system. When the rotor having a magnet rotates, the d-q axis coordinate system also rotates.

The switching control apparatus 9 receives the respective current value signals of the U-phase current Iu, the V-phase current Iv, and the W-phase current Iw from the current sensor 13. The switching control apparatus 9 receives the rotor rotation angle $\theta m$ to be transformed into the electric angle $\theta e$ from the rotation angle sensor 7. Then, the switching control apparatus 9 receives the voltage value signal of a DC bus-bar voltage Vpn from the voltage detection circuit 11. The switching control apparatus 9 transforms the respective current values of the U-phase current Iu, the V-phase current Iv, and the W-phase current Iw into a d-axis current detection value Id and a q-axis current detection value Iq through a coordinate transformation. The switching control apparatus 9 time-differentiates the electric angle θe so as to calculate an electric angular speed ω (rotation speed co).

The switching control apparatus 9 calculates a d-axis current difference between a d-axis current command value Idc and the d-axis current detection value Id and a q-axis current difference between a q-axis current command value Iqc and the q-axis current detection value Iq. The switching control apparatus 9 applies respective proportional integral control calculations to the foregoing current differences so as to calculate a d-axis voltage command value vdc and a q-axis voltage command value vqc.

From the d-axis voltage command value vdc and the q-axis voltage command value vqc, the switching control apparatus 9 calculates three-phase voltage command values Vuc, Vvc, and Vwc in a static coordinate system. From the three-phase voltage command values Vuc, Vvc, and Vwc and the DC bus-bar voltage Vpn, the switching control apparatus 9 calculates duty command values Du, Dv, and Dw. By use of the triangular-wave comparison method, which is generally utilized in driving an inverter, the switching control apparatus 9 calculates on/off control signals for the switching devices 14 through 19, from the duty command values Du, Dv, and Dw for the respective phases. Then, the switching control apparatus 9 outputs on/off control signals UU, UL, VU, VL, WU, and WL to the respective corresponding driving circuits. Hereinafter, for the sake of convenience, the respective outputs of the driving circuits will be also designated with UU, UL, VU, VL, WU, and WL.

The respective driving circuits turn on or off the switching devices 14 through 19, in accordance with the on/off control signals UU, UL, VU, VL, WU, and WL. The electric-power conversion circuit 12 makes the U-phase current Iu, the V-phase current Iv, and the W-phase current Iw flow so as to convert DC electric power into AC electric power, and then supplies the AC electric power to the electric rotating machine 6. Then, the electric-power conversion circuit 12 converts regenerative electric power, which is AC electric power generated by the electric rotating machine 6 in a regenerative state, into DC electric power, and charges the DC power source 4 with the DC electric power. In this situation, among the foregoing symbols, the electric angle θe, the torque command value Trqc, the d-axis current command values Idc and Id1c, the q-axis current command values Iqc and Iq1c, the d-axis voltage command value vdc, the q-axis voltage command value vqc, the three-phase voltage command values Vuc, Vvc, and Vwc, and the duty command values Du, Dv, and Dw are utilized in order to make the explanations easy to understand and are not described in the drawings or the equations.

<Excessive-Current-Handling Control>

The electric-power conversion apparatus 1 and the electric rotating machine 6 perform electric-power interchange with each other, based on the torque command value Trqc, the U-phase current Iu, the V-phase current Iv, the W-phase current Iw, the electric angle θe, and the DC bus-bar voltage Vpn. However, it is conceivable that due to malfunction of the rotation angle sensor 7 or the current sensor 13, a short-circuiting or short-to-ground fault of the AC bus-bars 5, or a temporary failure in the computing processing unit 90 (temporary fixation of the on/off control signal), the value of the U-phase current Iu, the V-phase current Iv, or the W-phase current Iw becomes an excessive value exceeding the normal control range.

In order to protect the electric-power conversion apparatus 1 at a time when such an excessive current flows, a threshold value for determining occurrence of an excessive current can be provided for each of the U-phase current Iu, the V-phase current Iv, and the W-phase current Iw. In addition to that, there is conceivable a protection circuit that turns off all the switching devices at a time when any of the foregoing currents exceeds the threshold value. As a result, the excessive current is suppressed.

Figure 3:
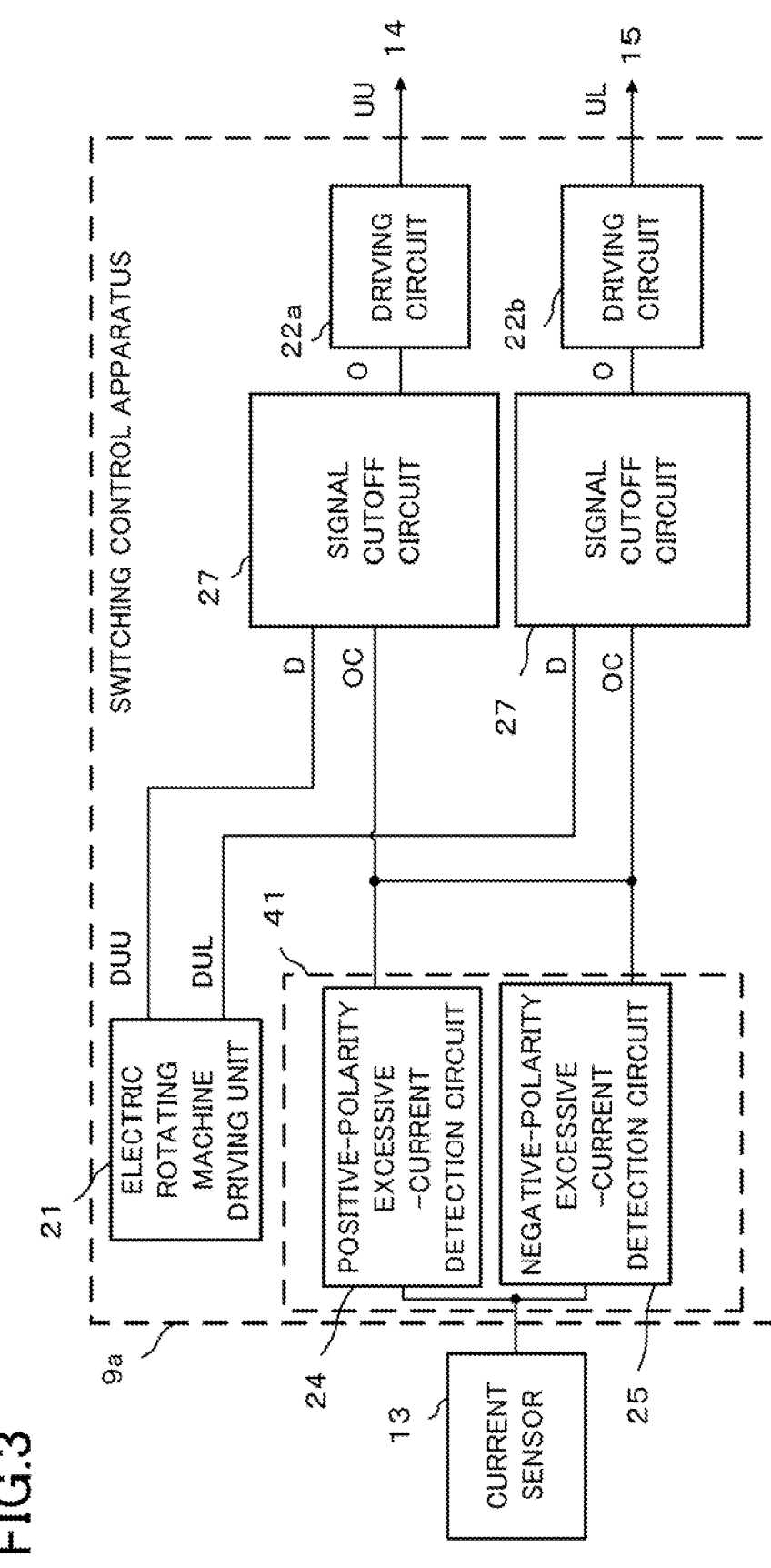
FIG. 3 is a block diagram representing excessive-current-handling control in an electric-power conversion apparatus according to Comparative Example.

FIG. 3 is a block diagram representing excessive-current-handling control in an electric-power conversion apparatus 1a according to Comparative Example (the electric-power conversion apparatus 1a is not represented). The electric-power conversion apparatus 1a according to Comparative Example can be configured by changing the hardware or the software of the switching control apparatus 9 in the electric-power conversion apparatus 1 according to Embodiment 1. In this case, as the switching control apparatus 9a, there will be explained an example in which the circuit for excessive-current-handling control in the switching control apparatus 9 is changed.

FIG. 3 represents the output portions for the upper switching device 14 and the lower switching device 15 related to the U phase in the block diagram of the excessive-current-handling control. The current detection unit 41 receives a signal from the current sensor 13 and then detects currents of the respective phases in the electric-power conversion apparatus 1a. The current detection unit 41 includes a positive-polarity excessive-current detection circuit 24 and a negative-polarity excessive-current detection circuit 25. Each of the positive-polarity excessive-current detection circuit 24 and the negative-polarity excessive-current detection circuit 25 compares the output of the current sensor 13 with a threshold value indicating an excessive current and outputs an excessive-current occurrence signal in the case where the output of the current sensor 13 exceeds the threshold value.

For example, in the case where any one of the U-phase current Iu, the V-phase current Iv, and the W-phase current Iw flows in the positive direction and becomes larger than a threshold value Ioc, the positive-polarity excessive-current detection circuit 24 outputs an H-signal; in any other cases, the positive-polarity excessive-current detection circuit 24 outputs an L-signal. In the case where any one of the U-phase current Iu, the V-phase current Iv, and the W-phase current Iw flows in the negative direction and the absolute value of the phase current becomes larger than the threshold value Ioc, the negative-polarity excessive-current detection circuit 25 outputs the H-signal; in any other cases, the negative-polarity excessive-current detection circuit 25 outputs the L-signal. In the case where no current flows, the current detection unit 41 maintains an L-output.

An electric rotating machine driving unit 21 outputs a signal DUU and a signal DUL for driving the U-phase upper switching device 14 and the U-phase lower switching device 15, respectively, that drive the electric rotating machine 6 in the normal state. In the case where an excessive-current detection signal OC is L, a signal cutoff circuit 27 directly outputs a driving signal D. Accordingly, in the case where the output of the current detection unit 41 is L, the switching control apparatus 9a directly transfers the outputs of the electric rotating machine driving unit 21 to the switching devices 14 and 15 by way of the driving circuits 22a and 22b, respectively.

In the case where the excessive-current detection signal OC is H, the signal cutoff circuit 27 maintains the output signal to be L, regardless of the state of the driving signal D. Accordingly, in the case where the output of the current detection unit 41 is H, the switching control apparatus 9a turns off the switching devices 14 and 15 by way of the driving circuits 22*a* and 22*b*, respectively, so as to cut off the currents.

FIG. 4 is a table representing the operational logic of the signal cutoff circuit 27 in the electric-power conversion apparatus 9*a* according to Comparative Example. FIG. 4 represents the logic of the output signal O to the excessive-current detection signal OC and the driving signal D, which are the inputs of the signal cutoff circuit 27. As described above, the logic of the signal cutoff circuit 27 is determined in priority to the excessive-current detection signal OC.

In FIG. 3, the logic of the signal cutoff circuit 27 for the U-phase switching devices 14 and 15 has been explained. Although in FIG. 3, the description is omitted, the electric rotating machine driving unit 21 also outputs a signal DVU for driving the V-phase upper switching device 16, a signal DVL for driving the V-phase lower switching device 17, a signal DWU for driving the W-phase upper switching device 18, and a signal DWL for driving the W-phase lower switching device 19. With regard to the V phase and the W phase, the signal cutoff circuit 27 and the driving circuit 22*a* for each of the upper switching devices 16 and 18 and the signal cutoff circuit 27 and the driving circuit 22*b* for each of the lower switching devices 17 and 19 are provided. As the excessive-current-handling control in the switching control apparatus 9*a* according to Comparative Example, in the case where any one of the respective absolute values of the U-phase current Iu, the V-phase current Iv, and the W-phase current Iw becomes larger than the threshold value Ioc, all the switching devices 15 through 19 are turned off.

<Cutoff Control>

Figure 6:
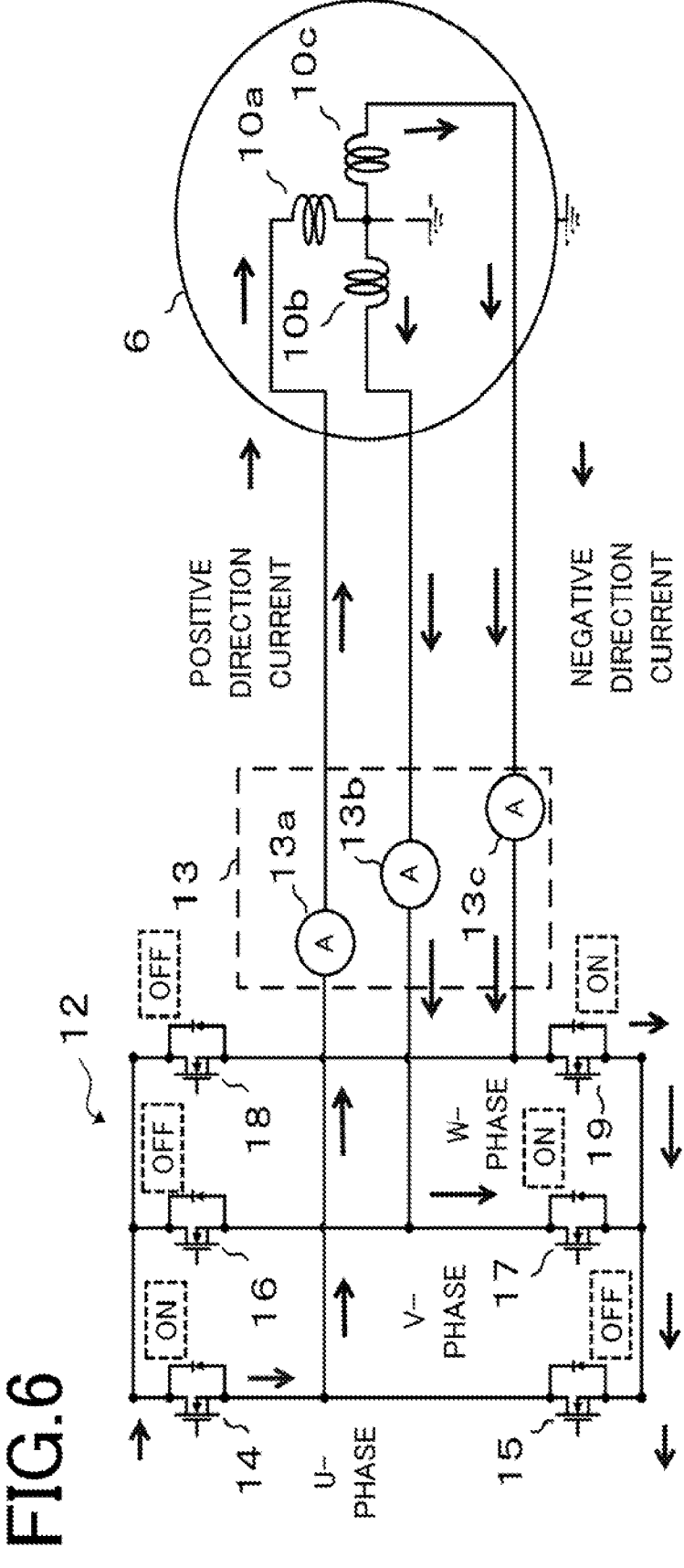
FIG. 6 is a diagram representing normal-time current flows in the electric-power conversion apparatus according to Embodiment 1.
Figure 7:
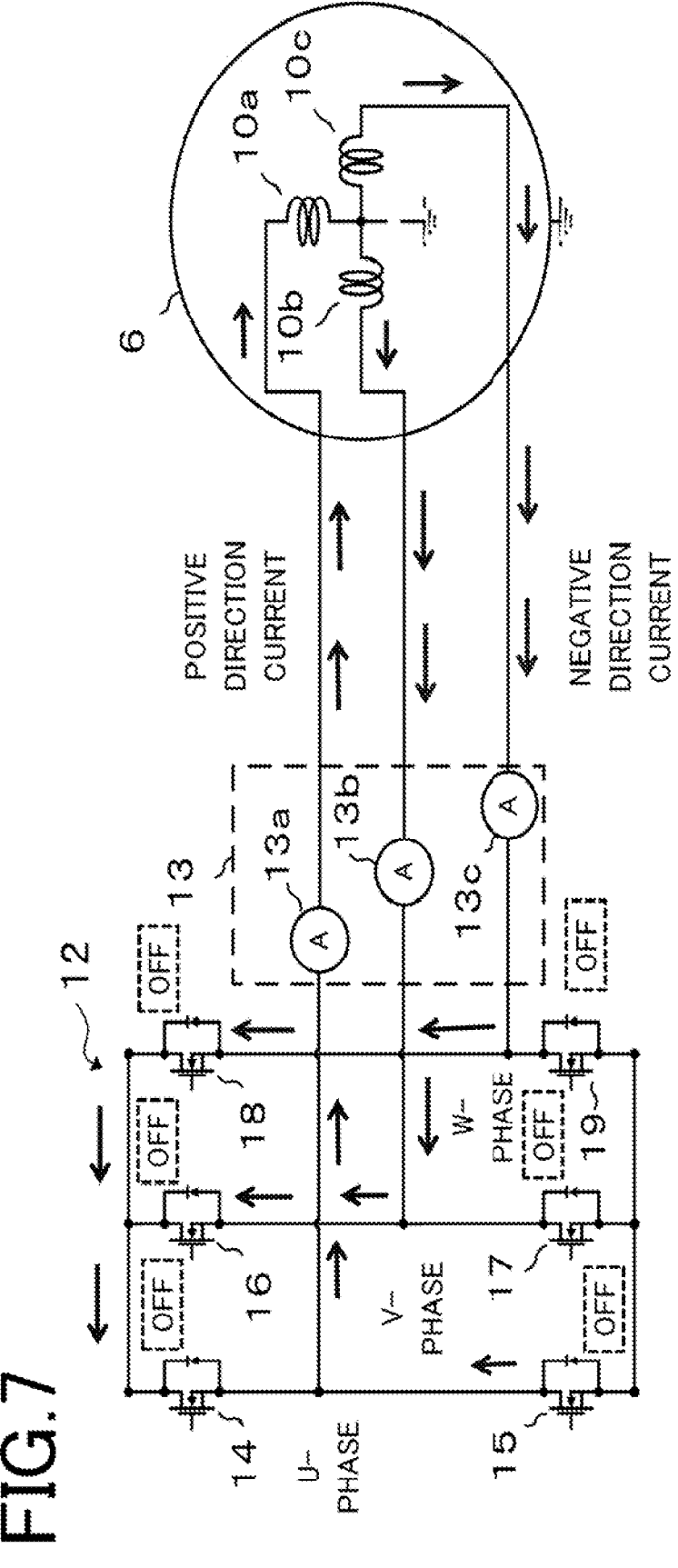
FIG. 7 is a diagram representing current flows during the excessive-current-handling control in the electric-power conversion apparatus according to Comparative Example.

FIG. 5 is a set of time charts representing the excessive-current-handling control in the electric-power conversion apparatus 1*a* according to Comparative Example. FIG. 6 is a diagram representing normal-time current flows in the electric-power conversion apparatus 1 according to Embodiment 1. FIG. 7 is a diagram representing current flows during the excessive-current-handling control in the electric-power conversion apparatus 1*a* according to Comparative Example. The normal-time current flows in the electric-power conversion apparatus 1*a* are the same as those in the electric-power conversion apparatus 1 according to Embodiment 1 in FIG. 6.

The currents that flow in the electric-power conversion circuit 12 at a time when an excessive current is detected and then all the switching devices 14 through 19 are turned off will be explained by use of FIGS. 5 through 7. FIG. 5 represents the respective waveforms of the phase currents Iu, Iv, and Iw. The lower time chart in FIG. 5 is obtained by extending the time axis of the upper time chart. The electric-power conversion operation 1*a* operates normally till a time point Ta. At the time point Ta, the U-phase upper switching device 14, the V-phase lower switching device 17, and the W-phase lower switching device 19 are turned on. The U-phase lower switching device 15, the V-phase upper switching device 16, and the W-phase upper switching device 18 are turned off.

In FIG. 6, the respective routes of the normal currents at this moment are indicated by arrows. A current flows from the positive-polarity DC bus-bar 3*a* to the U-phase winding 10*a* via the U-phase upper switching device 14. Then, the current is ramified into two currents at the node of the windings of the three phases; the two respective currents flow to the negative-polarity DC bus-bar 3*b* via a route passing through the V-phase winding 10*b* and the V-phase lower switching device 17 and via a route passing through the W-phase winding 10*c* and the W-phase lower switching device 19.

There will be considered the case where temporary fixation of the switching control apparatus 9*a* occurs and hence the respective on-states and off-states of the switching devices 14 through 19 are fixed. In this situation, because the control in a normal situation is not performed, the currents change.

At a time point Tb in FIG. 5, the U-phase current Iu becomes excessive and exceeds the threshold value Ioc. The switching control apparatus 9*a* detects the excessive current and hence all the control signals for the switching devices 14 through 19 become off, so that the currents are cut off. As a result, the excessive current can be suppressed.

In this situation, the currents flow as indicated in FIG. 7. A current flows in the U-phase winding 10*a* through the U-phase lower switching device 15. Then the current is ramified into two currents at the node of the windings of the three phases. The two respective currents flow via a route passing through the V-phase winding 10*b* and the V-phase upper switching device 16 and via a route passing through the W-phase winding 10*c* and the W-phase upper switching device 18.

Because when the respective currents flow through the switching devices 15, 16, and 18, the switching devices are each in an off state, the currents flow through the respective body diodes. In the case where the current that flows at this moment is an excessive current at a time of occurrence of an excessive current, the body diode may be deteriorated.

To date, in order to downsize an electric-power conversion apparatus including the inverter, there has been promoted use of a field-effect transistor (hereinafter, referred to as a SiC semiconductor FET) formed of a silicon carbide (SiC). Even when a SiC semiconductor FET is utilized, the conduction current in the body diode poses a problem. Bipolar operation by the body diode may cause deterioration in the crystal of the SiC semiconductor FET to proceed. When a current is made to continue flowing in the body diode, the deterioration in the crystal of the SiC semiconductor FET proceeds and hence the voltage across the body diode rises. As a result, the loss in the SiC semiconductor FET increases and hence the function of the device is deteriorated. Then, the electric-power conversion circuit has difficulty in operating in a stable manner.

<Three-Phase Short Circuit Processing>

In the electric-power conversion apparatus 1 according to Embodiment 1, in order to solve the foregoing problems, three-phase short circuit processing is performed for the occurrence of an excessive current. The three-phase short circuit processing means the one in which among the switching devices 14 through 19, all the upper switching devices 14, 16, and 18 are turned on and all the lower switching devices 15, 17, and 19 are turned off, or all the lower switching devices 15, 17, and 19 are turned on and all the upper switching devices 14, 16, and 18 are turned off.

<Voltage Equation>

In this situation, there will be explained a calculation method for a d-axis current value Id3*ps* and a q-axis current value Iq3*ps* in a steady state after the three-phase short circuit processing has been performed. At first, a voltage equation for a motor is expressed as the equation (1) below, by use of a d-axis voltage Vd, a Q-axis voltage Vq, the d-axis current command value Id, the q-axis current command value Iq, an armature winding resistance R of the motor, a d-axis inductance Ld of the motor, a q-axis inductance Lq of the motor, the number Φm of d-axis armature interlinkage flux lines of the motor, and the rotation speed ω of the motor.

$$\begin{bmatrix} Vd \\ Vq \end{bmatrix} = \begin{bmatrix} R + \dfrac{d}{dT}Ld & -\omega \cdot Lq \\ \omega \cdot Ld & R + \dfrac{d}{dt}Lq \end{bmatrix} \begin{bmatrix} Id \\ Iq \end{bmatrix} + \begin{bmatrix} 0 \\ \omega \cdot \Phi m \end{bmatrix} \tag{1}$$

The steady state after the three-phase short circuit processing has been performed is a state in which in the equation (1) above, both the d-axis voltage Vd and the Q-axis voltage Vq are "0". Accordingly, the voltage equation is expressed as the equation (2) below, by use of the d-axis current value Id3*ps* and the q-axis current value Iq3*ps* in the steady state after the three-phase short circuit processing has been performed.

$$\begin{bmatrix} 0 \\ 0 \end{bmatrix} = \begin{bmatrix} R + \dfrac{d}{dT}Ld & -\omega \cdot Lq \\ \omega \cdot Ld & R + \dfrac{d}{dt}Lq \end{bmatrix} \begin{bmatrix} Id3ps \\ Iq3ps \end{bmatrix} + \begin{bmatrix} 0 \\ \omega \cdot \Phi m \end{bmatrix} \tag{2}$$

From the equation (2) above, the d-axis current value Id3*ps* and the q-axis current value Iq3*ps* in the steady state after the three-phase short circuit processing has been performed are expressed by the equations (3) and (4).

$$Id3ps = \dfrac{-\omega^2 \cdot Lq \cdot \Phi m}{\omega^2 \cdot Ld \cdot Lq + R^2} \tag{3}$$

$$Iq3ps = \dfrac{-\omega \cdot R \cdot \Phi m}{\omega^2 \cdot Ld \cdot Lq + R^2} \tag{4}$$

The armature winding resistance R of the motor, the d-axis inductance Ld of the motor, the q-axis inductance Lq of the motor, and the number Φm of d-axis armature interlinkage flux lines of the motor that have been utilized in the calculations according to the above equations (3) and (4) are known values determined based on the electric rotating machine 6. In addition, the rotation speed ω of the motor is a value to be obtained from the electric angle θe.

The respective effective values of the U-phase current Iu, the V-phase current Iv, and the W-phase current Iw can be calculated according to the equation (5) below, by use of the d-axis current value Id3*ps* and the q-axis current value Iq3*ps*.

$$I\,\text{rms} = \sqrt{\dfrac{Id3ps^2 + Iq3ps^2}{3}} \tag{5}$$

<Operational Logic of Three-Phase Short Circuit Processing>

Figure 8:
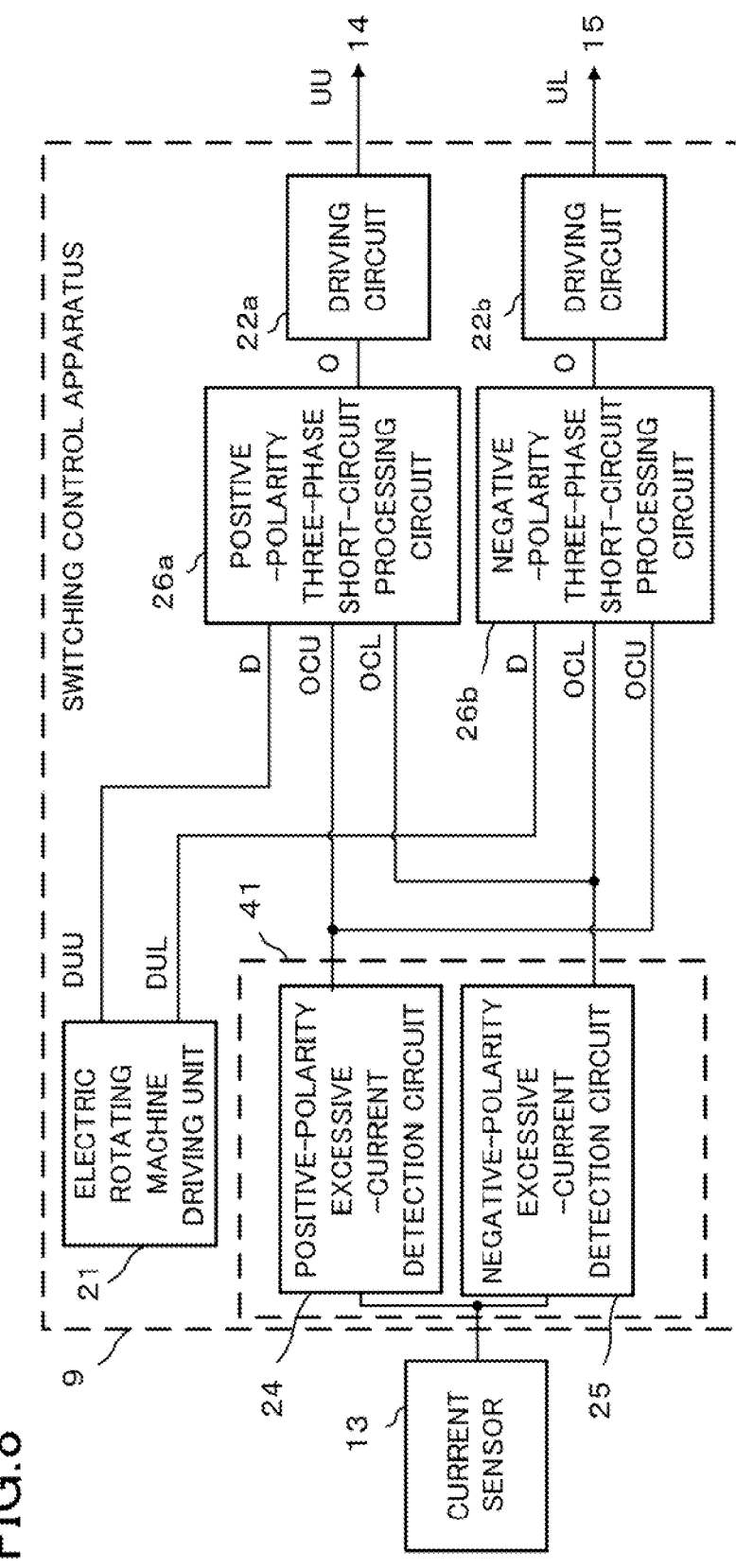
FIG. 8 is a block diagram of excessive-current-handling control in the electric-power conversion apparatus according to Embodiment 1.

FIG. 8 is a block diagram of excessive-current-handling control in the electric-power conversion apparatus 1 according to Embodiment 1. FIG. 8 represents the output portions for the upper switching device 14 and the lower switching device 15 related to the U phase in the block diagram of the excessive-current-handling control. The current detection unit 41 is the same as that in the block diagram in FIG. 3 according to Comparative Example and includes the positive-polarity excessive-current detection circuit 24 and the negative-polarity excessive-current detection circuit 25.

The positive-polarity excessive-current detection circuit 24 or the negative-polarity excessive-current detection circuit 25 compares the output of the current sensor 13 with the threshold value Ioc indicating an excessive current. When the absolute value of any one of the U-phase phase current Iu, the V-phase phase current Iv, and the W-phase phase current Iw that are detected by the current sensor 13 exceeds the threshold value Ioc, the positive-polarity excessive-current detection circuit 24 or the negative-polarity excessive-current detection circuit 25 outputs an excessive-current occurrence signal.

The output of the positive-polarity excessive-current detection circuit 24 and the output of the negative-polarity excessive-current detection circuit 25 are transferred to the positive-polarity three-phase short-circuit processing circuit 26*a* for the upper switching device and the negative-polarity three-phase short-circuit processing circuit 26*b* for the lower switching device, respectively. The positive-polarity three-phase short-circuit processing circuit 26*a* and the negative-polarity three-phase short-circuit processing circuit 26*b* determine the respective outputs thereof in accordance with whether the positive-polarity excessive-current detection circuit 24 has detected an excessive current or the negative-polarity excessive-current detection circuit 25 has detected an excessive current. At a normal time when no excessive current is detected, the positive-polarity three-phase short-circuit processing circuit 26*a* and the negative-polarity three-phase short-circuit processing circuit 26*b* directly transfer the outputs of the electric rotating machine driving unit 21 to the driving circuits 22*a* and 22*b*, respectively.

When a positive-polarity excessive current is detected by the positive-polarity excessive-current detection circuit 24, the positive-polarity three-phase short-circuit processing circuit 26*a* transmits an on instruction signal to the driving circuit 22*a*, so that the switching device 14 is turned on. At this moment, the negative-polarity three-phase short-circuit processing circuit 26*b* transmits an off instruction signal to the driving circuit 22*b*, so that the switching device 15 is turned off.

When a negative-polarity excessive current is detected by the negative-polarity excessive-current detection circuit 25, the positive-polarity three-phase short-circuit processing circuit 26*a* transmits the off instruction signal to the driving circuit 22*a*, so that the switching device 14 is turned off. At this moment, the negative-polarity three-phase short-circuit processing circuit 26*b* transmits the on instruction signal to the driving circuit 22*b*, so that the switching device 15 is turned on.

FIG. 9 is a table representing the operational logic of the positive-polarity three-phase short-circuit processing circuit 26*a* in the electric-power conversion apparatus 1 according to Embodiment 1. FIG. 9 represents the logic of the output signal O to a positive-polarity excessive-current detection signal OCU, a negative-polarity excessive-current detection signal OCL, and the driving signal D, which are the inputs of the positive-polarity three-phase short-circuit processing circuit 26*a*.

The logic of the positive-polarity three-phase short-circuit processing circuit 26*a* is determined in priority to the positive-polarity excessive-current detection signal OCU. "H" and "L" may be replaced by an ON signal and an OFF signal, respectively. In the case where the positive-polarity excessive-current detection signal OCU is "H", the output signal O continues to be in an H state, regardless of the respective states of the other input signals. In the case where the positive-polarity excessive-current detection signal OCU is "L", the logic is determined in priority to the negative-polarity excessive-current detection signal OCL. In that case, when the negative-polarity excessive-current detection signal OCL is "H", the output signal O continues to be in an L state, regardless of the state of the driving signal D. In the case where the positive-polarity excessive-current detection signal OCU is "H" and the negative-polarity excessive-current detection signal OCL is "L", the state of the driving signal D is transferred, as it is, to the output signal O.

FIG. 10 is a table representing the operational logic of the negative-polarity three-phase short-circuit processing circuit 26b in the electric-power conversion apparatus 1 according to Embodiment 1. FIG. 10 represents the logic of the output signal O to the positive-polarity excessive-current detection signal OCU, the negative-polarity excessive-current detection signal OCL, and the driving signal D, which are the inputs of the negative-polarity three-phase short-circuit processing circuit 26b.

The logic of the negative-polarity three-phase short-circuit processing circuit 26b is determined in priority to the positive-polarity excessive-current detection signal OCU. "H" and "L" may be replaced by an ON signal and an OFF signal, respectively. In the case where the positive-polarity excessive-current detection signal OCU is "H", the output signal O continues to be in the L state, regardless of the respective states of the other input signals. In the case where the positive-polarity excessive-current detection signal OCU is "L", the logic is determined in priority to the negative-polarity excessive-current detection signal OCL. In that case, when the negative-polarity excessive-current detection signal OCL is "H", the output signal O continues to be in the H state, regardless of the state of the driving signal D. In the case where the positive-polarity excessive-current detection signal OCU is "L" and the negative-polarity excessive-current detection signal OCL is "L", the state of the driving signal D is transferred, as it is, to the output signal O.

In this situation, it may be allowed that while a positive-polarity excessive current is detected, detection of a negative-polarity excessive current is made ineffective and that while a negative-polarity excessive current is detected, detection of a positive-polarity excessive current is made ineffective. Moreover, it may be allowed that an excessive-current occurrence determination threshold value and an excessive-current disappearance determination threshold value are set to respective different values so that a hysteresis is provided. This method can suppress the excessive-current determination from becoming unstable due to occurrence of vibration or jitter.

In FIG. 8, the logics of the positive-polarity three-phase short-circuit processing circuit 26a and the negative-polarity three-phase short-circuit processing circuit 26b for the U-phase switching devices 14 and 15, respectively, have been explained. Although in FIG. 8, the description is omitted, the electric rotating machine driving unit 21 also outputs the signal DVU for driving the V-phase upper switching device 16, the signal DVL for driving the V-phase lower switching device 17, the signal DWU for driving the W-phase upper switching device 18, and the signal DWL for driving the W-phase lower switching device 19.

With regard to the V phase and the W phase, the positive-polarity three-phase short-circuit processing circuit 26a and the driving circuit 22a for the upper switching devices 16 and 18 and the negative-polarity three-phase short-circuit processing circuit 26b and the driving circuit 22b for the lower switching devices 17 and 19 are provided. As the excessive-current-handling control in the switching control apparatus 9 according to Embodiment 1, in the case where any one of the respective absolute values of the U-phase current Iu, the V-phase current Iv, and the W-phase current Iw becomes larger than the threshold value Ioc, three-phase short-circuit processing is performed. In other words, all the upper switching devices 14, 16, and 18 are turned on and all the lower switching devices 15, 17, and 19 are turned off, or all the lower switching devices 15, 17, and 19 are turned on and all the upper switching devices 14, 16, and 18 are turned off.

<Discrimination of Switching Device with Excessive Current>

Figure 11:
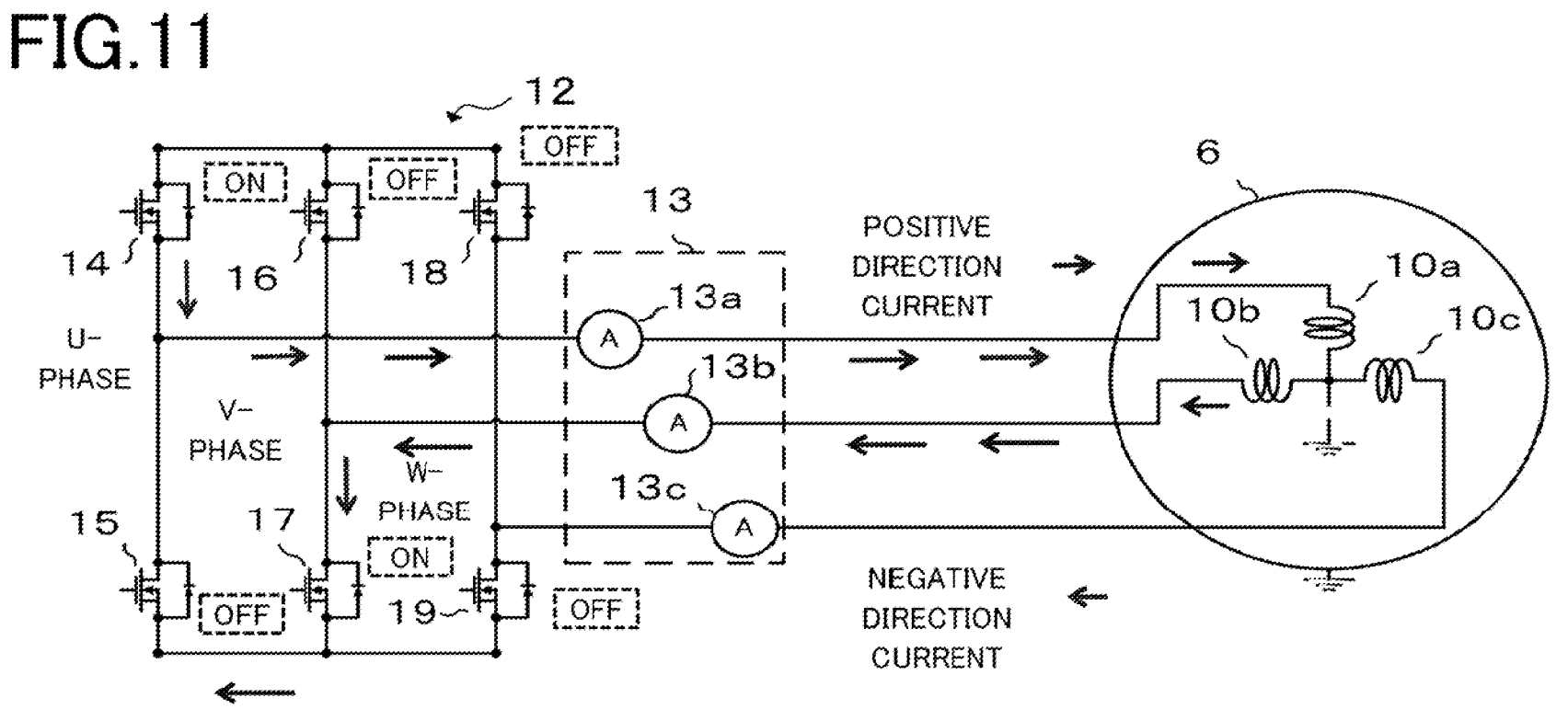
Figure 12:
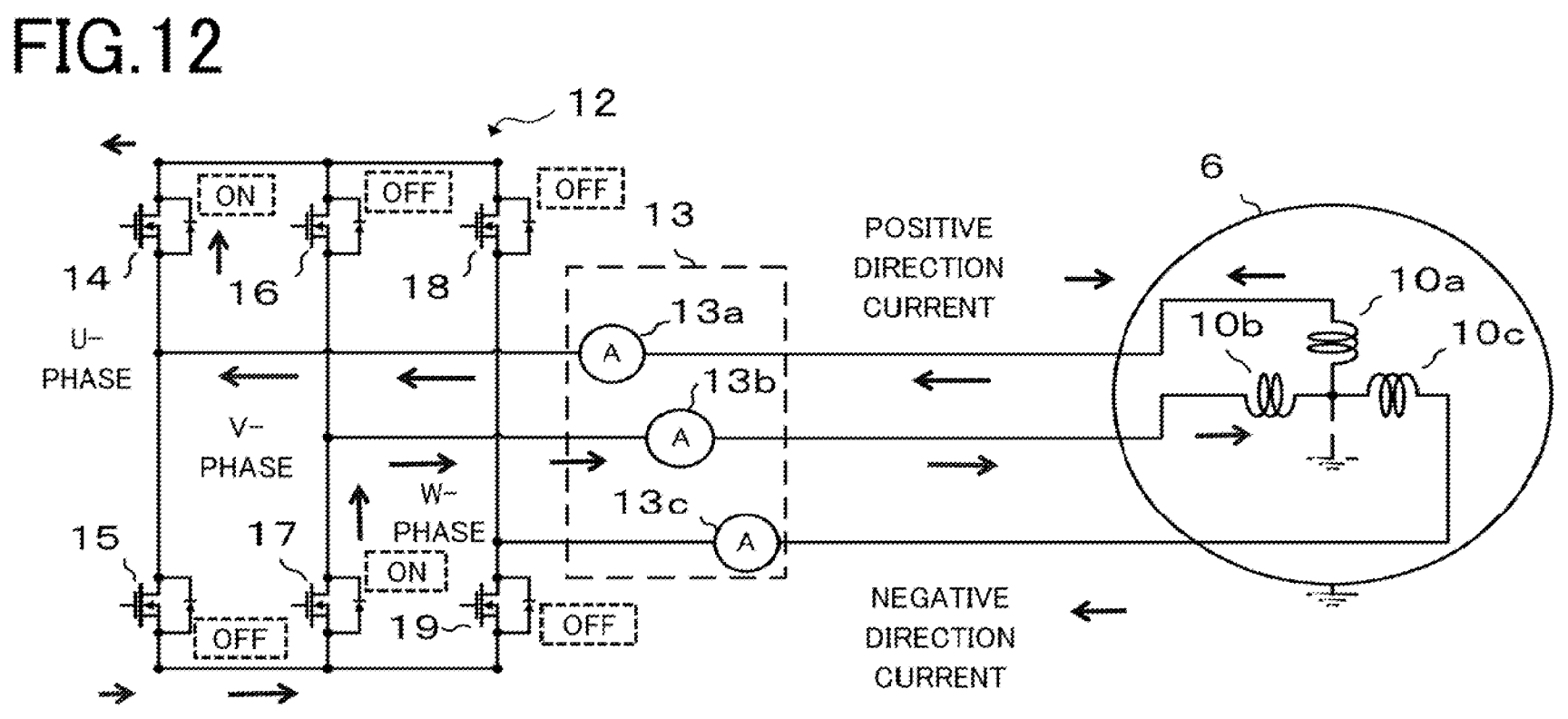

FIG. 11 is a first diagram representing the relationship between a current direction and excessive-current detection in the electric-power conversion apparatus 1 according to Embodiment 1. FIG. 12 is a second diagram representing the relationship between a current direction and excessive-current detection. In this section, there will be explained a method in which a switching device with an excessive current is discriminated by the respective directions of currents detected by the U-phase current sensor 13a, the V-phase current sensor 13b, and the W-phase current sensor 13c.

FIG. 11 represents an example in which the upper switching device 14 and the lower switching device 17 are turned on and in which the phase current Iu and the phase current Iv are flowing in the positive direction and in the negative direction, respectively. At this moment, the voltage of the DC bus-bar is applied to the U-phase winding 10a and the V-phase winding 10b and an excitation current is flowing therein. The phase current Iu detected by the U-phase current sensor 13a increases in the positive direction; the phase current Iv detected by the V-phase current sensor 13b increases in the negative direction.

When increasing to exceed the threshold value Ioc, an excessive current is detected. Accordingly, when the positive-direction current detected by the U-phase current sensor 13a becomes an excessive current, the upper switching device 14 is in the on state; thus, it can be determined that an excessive current has occurred in the switching device 14. Similarly, when the negative-direction current detected by the V-phase current sensor 13b becomes an excessive current, the lower switching device 17 is in the on state; thus, it can be determined that an excessive current has occurred in the switching device 17.

FIG. 12 represents a case in which the upper switching device 14 and the lower switching device 17 are turned on and in which the phase current Iu and the phase current Iv are flowing in the negative direction and in the positive direction, respectively. In this situation, each of the U-phase winding 10a and the V-phase winding 10b generates a counterelectromotive voltage and hence a reflux current is flowing. In other words, FIG. 12 represents the state where the DC power source 4 is charged with electric power generated by the electric rotating machine 6.

At this moment, the phase current Iu detected by the U-phase current sensor 13a decreases in the negative direction, and the phase current Iv detected by the V-phase current sensor 13b decreases in the positive direction. Because the current decreases, no excessive current occurs in the state represented in FIG. 12.

The foregoing phenomena are not limited to the combination of the switching device 14 and the switching device 17. The same explanation can be applied also to the relationship between a current and a voltage in a combination of other switching devices. In other words, in the case where when each of the phase currents Iu, Iv, and Iw has the positive direction, an excessive current is detected, it can be determined that the excessive current has occurred in each corresponding one of the upper switching devices 14, 16, and 18. In the case where when each of the phase currents Iu, Iv, and Iw has the negative direction, an excessive current is detected, it can be determined that the excessive current has occurred in each corresponding one of the lower switching devices 15, 17, and 19.

<Currents During Three-Phase Short Circuit Processing>

Figure 13:
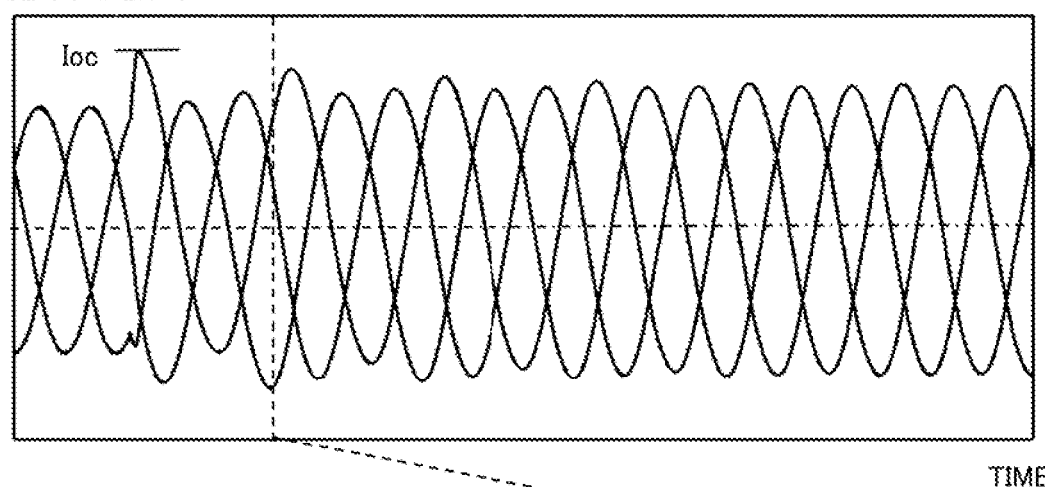
FIG. 13 is a set of time charts representing the excessive-current-handling control in the electric-power conversion apparatus according to Embodiment 1.
Figure 13:
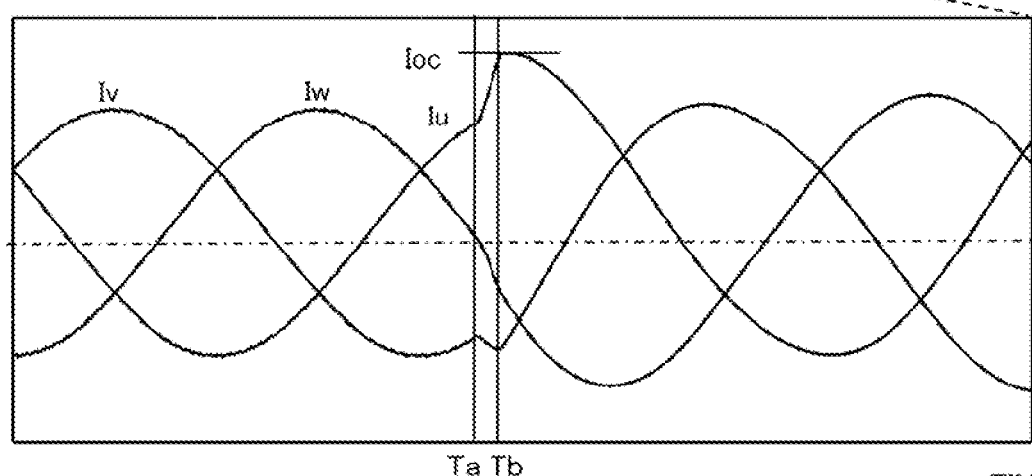
Figure 14:
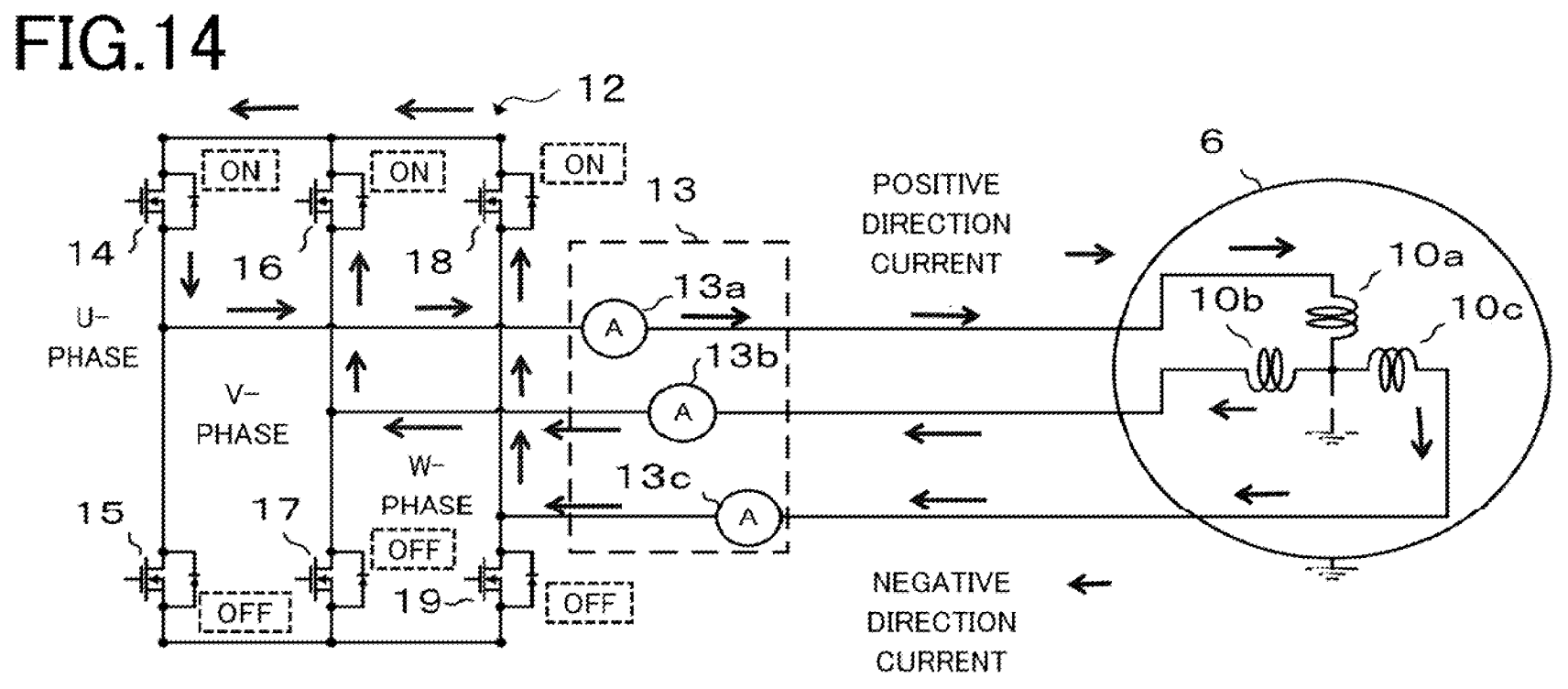

FIG. 13 is a set of time charts representing the excessive-current-handling control in the electric-power conversion apparatus 1 according to Embodiment 1. FIG. 14 is a diagram representing current flows during the excessive-current-handling control in the electric-power conversion apparatus 1 according to Embodiment 1. By use of FIGS. 13 and 14, there will be explained the operation at a time when the positive-polarity three-phase short-circuit processing circuit 26a for the upper switching devices and the negative-polarity three-phase short-circuit processing circuit 26b for the lower switching devices perform the three-phase short-circuiting.

FIG. 13 represents the respective waveforms of the phase currents Iu, Iv, and Iw. The lower time chart in FIG. 13 is obtained by extending the time axis of the upper time chart. The electric-power conversion operation 1 operates normally till a time point Ta. At the time point Ta, the U-phase upper switching device 14, the V-phase lower switching device 17, and the W-phase lower switching device 19 are turned on. The U-phase lower switching device 15, the V-phase upper switching device 16, and the W-phase upper switching device 18 are turned off.

In this case, currents flow through the paths represented in FIG. 6. A current flows in the U-phase winding 10a through the U-phase upper switching device 14. Then, the current is ramified into two currents at the node of the windings of the three phases; the two respective currents flow via a route passing through the V-phase winding 10b and the V-phase lower switching device 17 and via a route passing through the W-phase winding 10c and the W-phase lower switching device 19.

There will be considered the case where temporary fixation of the switching control apparatus 9a occurs and hence the respective on-states and off-states of the switching devices 14 through 19 are fixed. In this situation, because the control in a normal situation is not performed, the currents change.

At a time point Tb in FIG. 13, the U-phase current Iu becomes excessive and exceeds the threshold value Ioc. The switching control apparatus 9 detects an excessive current in an upper switching device and then the three-phase short circuit processing in which all the upper switching devices 14, 16, and 18 are turned off is performed. Simultaneously, all the lower switching devices 15, 17, and 19 are turned off.

As represented in FIG. 14, a current flows in the U-phase winding 10a through the U-phase upper switching device 14. The current is ramified into two currents at the node of the windings of the three phases; the two respective currents flow via a route passing through the V-phase winding 10b and the V-phase upper switching device 16 and via a route passing through the W-phase winding 10c and the W-phase upper switching device 18.

In this situation, because the switching device 14 maintains the on state, it is made possible to prevent an excessive current from flowing in the body diode of the switching device 15 at the opposite side of the switching device 14.

Because each of the switching devices 16 and 18 is turned on and hence has a small resistance value referred to as on-resistance, the current flows not in the body diode but in the transistor portion of the switching device.

In the case of three-phase short-circuiting, although the current temporarily increases, it converges on the current effective value expressed by the equation (5). As a result, the excessive current can be suppressed. During this time, each of the switching devices 14, 16, and 18 in which the current flows is in the on state; thus, no current flow in the body diode.

As described above, in the case where an excessive current flows in the switching device of the electric-power conversion apparatus 1, any one of the group of all the positive-polarity switching devices and the group of all the negative-polarity switching devices are turned on and the other one thereof are turned off, so that it is made possible to suppress a large current from flowing in the body diode of the switching device, while suppressing an excessive current. As a result, it is made possible to obtain an electric-power conversion apparatus 1 that does not require any additionally provided reflux diode and expansion of the semiconductor size and that can protect the body diode so as to prevent the switching device from being deteriorated, while promoting downsizing and cost saving.

In the foregoing explanation, there have been provided the positive-polarity three-phase short-circuit processing circuit 26a and the negative-polarity three-phase short-circuit processing circuit 26b for switching the ON/OFF signal of the electric rotating machine driving unit 21 to ON continuation or OFF continuation. However, it may be allowed that instead of normal ON/OFF signal input, input forcibly instructing ON or OFF is provided in the driving circuit and the signal instructed by the result of excessive-current detection is inputted.

After the three-phase short circuit processing has been performed, the current converges on the current effective value expressed in the equation (5). It may be allowed that after due to the current convergence, the absolute value of the current value decreases down to a required value and becomes smaller than a second threshold value, which is smaller than the threshold value Ioc, the three-phase short circuit processing is cancelled and then all the switching devices are turned off. As a result, the phase current flowing in the winding can be changed to "0". Moreover, in the foregoing process, it is made possible to decrease the current flowing in the body diode after all the switching devices have been turned off.

In this situation, because the three-phase short circuit processing is cancelled with the current value the same as or smaller than the allowable current value of the body diode, deterioration of the body diode and shortening of the life time thereof can be prevented. Accordingly, it is effective that the second threshold value is determined based on the characteristics of the body diode in the switching device.

In addition, it may be allowed that the three-phase short circuit processing is cancelled based on the second threshold value that is a current value with which a surge voltage that occurs at a time when the switching device is turned off becomes lower than the allowable voltage. For that purpose, it is effective that the second threshold value is determined based on the characteristics of the electric rotating machine 6. As a result, the switching device can be prevented from failing at a time when the breakdown voltage is exceeded.

Moreover, it may be allowed that when the switching device is turned off, an OFF transition time that is longer than a normal one is adopted. As a result, because a surge voltage is further suppressed from occurring, the switching device can be prevented from failing at a time when the breakdown voltage is exceeded.

2. Embodiment 2

Figure 15:
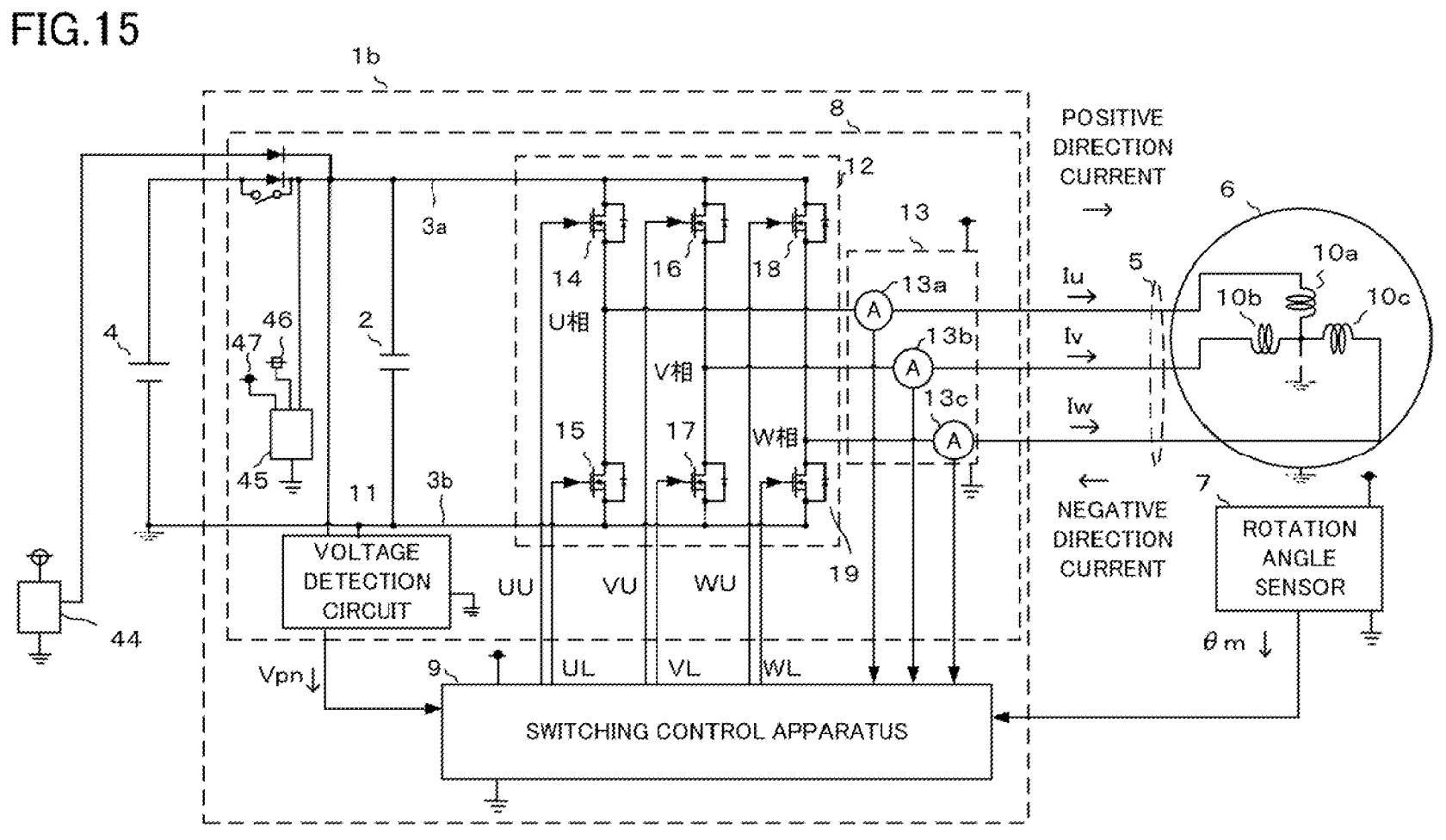

FIG. 15 is a configuration diagram of an electric-power conversion apparatus 1b according to Embodiment 2. The block diagram in FIG. 15 is different from the block diagram of the electric-power conversion apparatus 1 in FIG. 1 according to Embodiment 1 in that the electric-power conversion apparatus 1b is connected with a second DC power source 44 in addition to the DC power source 4.

Providing a power-source circuit that generates a power source from the DC power source 4 and the second DC power source 44 makes it possible to perform the three-phase short circuit processing even when the DC power source 4 fails; thus, the electric-power conversion apparatus 1b can more securely operate. The second DC power source 44 may be a secondary battery to be charged by the DC power source 4. Moreover, the second DC power source 44 may be a power source to be generated by stepping down a higher-voltage power source through a DC-DC converter. Furthermore, the second DC power source 44 may be a power source to be generated by stepping up a lower-voltage power source through a DC-DC converter.

In general, in many cases, each of the switching control apparatus 9, the voltage detection circuit 11, the current sensor 13, the rotation angle sensor 7, and the like is operated with a power source generated from a low-voltage DC power source such as a lead battery. When the low-voltage DC power source fails, the foregoing three-phase short circuit processing cannot be performed. It may be allowed that in order to prevent such a situation, a power-source circuit 45 that can generate a power source from the higher voltage DC power source 4 is provided in addition to the low-voltage power source. As a result, even when the low-voltage DC power source fails, a power source can be generated from the DC power source 4; thus, the three-phase short circuit processing can be performed.

In FIG. 15, the power-source circuit 45 can supply a 5-volt power source 47 to the switching control apparatus 9, the voltage detection circuit 11, the current sensor 13, the rotation angle sensor 7, and the like also from any one of the DC power source 4 and a low-voltage DC power source 46. In the present embodiment, there has been explained the case where the DC power source 4 is a power source other than a lead battery; however, it may be allowed that the DC power source 4 is a power source utilizing a lead battery.

In the present embodiment, as each of the switching devices 14 through 19, a wide bandgap semiconductor typified by a SiC semiconductor FET may be utilized. A wide bandgap semiconductor can operate with a voltage, a frequency, and a temperature that are much higher than those with which a conventional semiconductor material such as silicon or gallium arsenide can operate. Accordingly, the switching device can be made to have a higher performance while being downsized and weight-saved. Because the deterioration in the crystal can be suppressed in the three-phase short circuit processing according to the present disclosure, it is more suitable to utilize a SiC semiconductor FET.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the specification of the present disclosure. For example, at least one of the constituent components may be modified, added, or eliminated; moreover, at least one of the constituent components mentioned in at least one of the preferred embodiments may be selected and combined with the constituent components mentioned in another preferred embodiment.

Hereinafter, respective features disclosed in the present disclosure will collectively be described as appendixes.

(Appendix 1) An electric-power conversion apparatus comprising:

respective arms of three phases in each of which there are provided a positive-polarity switching device connected with a positive-polarity side of a DC power source, a negative-polarity switching device connected with a negative-polarity side of the DC power source, and an external connection point at which the positive-polarity switching device and the negative-polarity switching device are connected in series with each other and that is connected with a winding of an electric rotating machine;

a phase current detection unit that detects a current of each of the three phases flowing between the corresponding external connection point and the corresponding winding; and a switching control apparatus that controls the electric rotating machine by turning on or off the positive-polarity switching devices and the negative-polarity switching devices and that determines that an excessive current has occurred, in the case where a current detected by the phase current detection unit exceeds a predetermined threshold value, and then turns on any one of a group of all the positive-polarity switching devices and a group of all the negative-polarity switching devices and turns off the other one thereof.

(Appendix 2) The electric-power conversion apparatus according to Appendix 1, wherein the phase current detection unit detects a direction of a current of each of the three phases flowing between the corresponding external connection point and the corresponding winding and a current value, and wherein based on a direction of a current detected by the phase current detection unit at a time of determination that the excessive current has occurred, the switching control apparatus determines whether the excessive current has occurred in the positive-polarity switching device or in the negative-polarity switching device.

(Appendix 3) The electric-power conversion apparatus according to Appendix 2, wherein when determining that the excessive current has occurred, the switching control apparatus turns on any one of the positive-polarity switching device and the negative-polarity switching device, in which the excessive current has occurred, and turns off the other one thereof.

(Appendix 4) The electric-power conversion apparatus according to any one of Appendixes 1 through 3, wherein when determining that the excessive current has occurred, the switching control apparatus turns on any one of the positive-polarity switching device and the negative-polarity switching device, in which the excessive current has occurred, and turns off the other one thereof, and then turns off all the switching devices, in the case where a current value detected by the phase current detection unit becomes the same as or smaller than a predetermined second threshold value.

(Appendix 5) The electric-power conversion apparatus according to Appendix 4, wherein based on characteristics of the electric rotating machine, there is specified the second threshold value that is compared with a current value detected by the phase current detection unit so that the switching control apparatus determines whether or not all the switching devices are to be turned off.

(Appendix 6) The electric-power conversion apparatus according to any one of Appendixes 4 and 5, wherein based on characteristics of a body diode included in the switching device, there is specified the second threshold value that is compared with a current value detected by the phase current detection unit so that the switching control apparatus determines whether or not all the switching devices are to be turned off.

(Appendix 7) The electric-power conversion apparatus according to any one of Appendixes 4 through 6, wherein based on switching characteristics of the switching device, there is specified the second threshold value that is compared with a current value detected by the phase current detection unit so that the switching control apparatus determines whether or not all the switching devices are to be turned off.

(Appendix 8) The electric-power conversion apparatus according to any one of Appendixes 4 through 7, wherein the switching control apparatus turns off all the switching devices in an OFF transition time that is longer than a normal OFF time.

(Appendix 9) The electric-power conversion apparatus according to any one of Appendixes 1 through 8, further comprising a power-source circuit that can generate a power source from any one of the DC power source and a second DC power source.

(Appendix 10) The electric-power conversion apparatus according to Appendix 9, wherein the phase current detection unit is supplied with a power source by the power-source circuit.

(Appendix 11) The electric-power conversion apparatus according to any one of Appendixes 1 through 10, wherein as the switching device, a wide bandgap semiconductor is utilized.

What is claimed is:

1. An electric-power conversion apparatus comprising:
respective arms of three phases in each of which there are provided a positive-polarity switching device connected with a positive-polarity side of a DC power source, a negative-polarity switching device connected with a negative-polarity side of the DC power source, and an external connection point at which the positive-polarity switching device and the negative-polarity switching device are connected in series with each other and that is connected with a winding of an electric rotating machine;
a phase current detector that detects a current of each of the three phases flowing between the corresponding external connection point and the corresponding winding; and
a switching control apparatus that controls the electric rotating machine by turning on or off the positive-polarity switching devices and the negative-polarity switching devices and that determines that an excessive current has occurred, in the case where a current detected by the phase current detector exceeds a predetermined threshold value, wherein the phase current detector detects a direction of a current of each of the three phases flowing between the corresponding external connection point and the corresponding winding and the detected current, wherein base on the direction of the current detected by the phase current detector at a time of determination that the excessive current has occurred, the switching control apparatus determines whether the excessive current has occurred in the positive-polarity switching device or in the negative-polarity switching device, and wherein: when it is determined that the excessive current has occurred in the positive-polarity switching device; the switching control apparatus turns on all the positive-polarity switching devices and turns off all the negative-polarity switching devices, and when it is determined that the excessive current has occurred in the negative-polarity switching device; the switching control apparatus turns on all the negative-polarity switching devices and turns off all the positive-polarity switching devices.

2. The electric-power conversion apparatus according to claim 1, wherein after the switching control apparatus turns on one of all the positive-polarity switching devices and all the negative-polarity switching devices, in which the excessive current has occurred, and turns off the other one of all the positive-polarity switching devices and all the negative-polarity switching devices, in response to a determination that a current value detected by the phase current detector becomes the same as or smaller than a predetermined second threshold value, all positive-polarity switching devices and all the negative-polarity switching devices are turned off.

3. The electric-power conversion apparatus according to claim 2, wherein based on characteristics of the electric rotating machine, there is specified the second threshold value that is compared with a current value detected by the phase current detector so that the switching control apparatus determines whether or not all the switching devices are to be turned off.

4. The electric-power conversion apparatus according to claim 2, wherein based on characteristics of a body diode included in the switching device, there is specified the second threshold value that is compared with a current value detected by the phase current detector so that the switching control apparatus determines whether or not all the switching devices are to be turned off.

5. The electric-power conversion apparatus according to claim 2, wherein based on switching characteristics of the switching device, there is specified the second threshold value that is compared with a current value detected by the phase current detector so that the switching control apparatus determines whether or not all the switching devices are to be turned off.

6. The electric-power conversion apparatus according to claim 2, wherein the switching control apparatus turns off all the switching devices in an OFF transition time that is longer than a normal OFF transition time.

7. The electric-power conversion apparatus according to claim 1, further comprising a power-source circuit that can generate a power source from any one of the DC power source and a second DC power source.

8. The electric-power conversion apparatus according to claim 7, wherein the phase current detector is supplied with a power source by the power-source circuit.

9. The electric-power conversion apparatus according to claim 1, wherein as the switching device, a wide bandgap semiconductor is utilized.

* * * * *